United States Patent
Yoon et al.

(10) Patent No.: US 12,125,381 B2
(45) Date of Patent: Oct. 22, 2024

(54) SURVEILLANCE SYSTEM FOR DETECTING VEHICLE VIOLATING EXCLUSIVE BUS LANE

(71) Applicant: G&T Solutions, Inc., Seoul (KR)

(72) Inventors: Heedon Yoon, Seoul (KR); Yujeong Choe, Incheon (KR); Inwon Yeon, Seoul (KR); Sangwan Yang, Gimpo-si (KR); Sangcheol Kang, Seoul (KR)

(73) Assignee: G&T Solutions, Inc., Seoul (KR)

( * ) Notice: Subject to any disclaimer, the term of this patent is extended or adjusted under 35 U.S.C. 154(b) by 0 days.

(21) Appl. No.: 18/373,228

(22) Filed: Sep. 26, 2023

(65) Prior Publication Data
US 2024/0312340 A1 Sep. 19, 2024

(30) Foreign Application Priority Data
Oct. 5, 2022 (KR) ........................ 10-2022-0127267

(51) Int. Cl.
*G08G 1/017* (2006.01)
*G06V 20/54* (2022.01)
*G06V 20/62* (2022.01)

(52) U.S. Cl.
CPC .......... *G08G 1/0175* (2013.01); *G06V 20/54* (2022.01); *G06V 20/625* (2022.01)

(58) Field of Classification Search
CPC ........ G08G 1/0175; G08G 1/054; G08G 1/01; G06V 20/54; G06V 20/625; G06V 20/58; G06V 2201/08; G07B 15/00; G06T 2207/30236; G06T 2207/30268
USPC ......... 348/149; 340/937, 933, 905; 382/104, 382/105
See application file for complete search history.

(56) References Cited

U.S. PATENT DOCUMENTS

| | | | | |
|---|---|---|---|---|
| 2008/0175438 A1* | 7/2008 | Alves | .............. | G08G 1/0175 |
| | | | | 382/104 |
| 2013/0232785 A1* | 9/2013 | Chawgo | ............ | H01R 43/0427 |
| | | | | 29/863 |
| 2015/0278617 A1* | 10/2015 | Oami | ................ | G06V 20/593 |
| | | | | 382/103 |

(Continued)

FOREIGN PATENT DOCUMENTS

| | | | |
|---|---|---|---|
| KR | 10-2018-0094501 A | | 8/2018 |
| KR | 20220051991 A | * | 4/2022 |
| WO | WO-2020256238 A1 | * | 12/2020 ............. G06Q 50/26 |

*Primary Examiner* — Brian P Yenke
*Assistant Examiner* — Omer Khalid
(74) *Attorney, Agent, or Firm* — Heedong Chae; Lucem, PC

(57) ABSTRACT

The present disclosure relates to a surveillance system for detecting a vehicle violating an exclusive bus lane, more particularly, to a surveillance system for detecting a vehicle violating an exclusive bus lane, the surveillance system detecting the car type and the number of in-vehicle persons of a vehicle entering a highway through one or more cameras disposed at a highway entrance tollgate or a highway on-ramp and issuing a pass when a condition for using an exclusive bus lane is satisfied; and surveilling whether vehicles use an exclusive bus lane through one or more surveillance cameras disposed on the highway and detecting and sanctioning vehicles not issued with a pass as violating vehicles, which violate the law about use of an exclusive bus lane, depending on whether a pass was issued, by inquiring into the plate numbers of the vehicles using the exclusive bus lane.

9 Claims, 5 Drawing Sheets

(56) References Cited

U.S. PATENT DOCUMENTS

2016/0358463 A1* 12/2016 Cho ................... G08G 1/0145
2017/0300766 A1* 10/2017 Kang .................. B60Q 11/005

* cited by examiner

SURVEILLANCE SYSTEM FOR DETECTING VEHICLE VIOLATING EXCLUSIVE BUS LANE

CROSS REFERENCE TO RELATED APPLICATION

The present application claims priority to Korean Patent Applications No. 10-2022-0127267, filed Oct. 5, 2022 the entire contents of which are incorporated herein for all purposes by this reference.

BACKGROUND

Technical Field

The present disclosure relates to a surveillance system for detecting a vehicle violating an exclusive bus lane. In more detail, the present disclosure relates to a surveillance system for detecting a vehicle violating an exclusive bus lane, the surveillance system detecting the car type and the number of in-vehicle persons of a vehicle entering a highway through one or more cameras disposed at a highway entrance tollgate or a highway on-ramp and issuing a pass when a condition for using an exclusive bus lane is satisfied; and surveilling whether vehicles use an exclusive bus lane through one or more surveillance cameras disposed on the highway and detecting and sanctioning vehicles not issued with a pass as violating vehicles, which violate the law about use of an exclusive bus lane, depending on whether a pass was issued, by inquiring into the plate numbers of the vehicles using the exclusive bus lane.

Description of the Related Art

According to the current regulation on violation of the exclusive bus lanes of highways, when vehicles excluding 9 or more-seater passenger cars and vans (including the case when six or more persons are in passenger cars or 12 or less-seater vans) that are driven on a highway use an exclusive bus lane, these vehicles are the objects of sanction under relevant laws. Further, even in the case of vehicles that are not buses but allowed to use exclusive bus lanes, when the number of in-vehicle persons of vehicles does not satisfy 6 that is a reference number of persons for using exclusive bus lanes, the vehicles are also objects of sanction.

Recently, as traffic congestion increases, vehicles that use exclusive bus lanes without satisfying the reference number of persons that allows use of exclusive bus lanes are increasing, and accordingly, traffic congestion in exclusive bus lanes constructed to activate use of public transportation increases, whereby there is a problem that the efficiency of exclusive bus lanes is neutralized.

Surveillance on vehicles that use exclusive bus lanes while violating laws and regulations is being intensified, and for this purpose, policemen regulate violation of exclusive bus lanes in person.

That is, policemen visually check in person the types of vehicles using exclusive bus lanes and whether the vehicles violate the condition of 6 or more persons, but there is a problem that policemen have difficulty in accurately checking the number of in-vehicle persons when they visually check vehicles being driven in exclusive bus lanes because the inside of the vehicles is not seen due to tinted windows, etc.

Further, a problem of causing a car accident or traffic congestion may be generated while a policeman stops or moves a vehicle that is running on a highway to the shoulder for regulation.

In order to prevent this problem, recently, a system that images the license plates of vehicles running in the exclusive bus lanes of highways through cameras installed on the highways, and discriminates and regulates only under-9-seater passenger cars through car registration check is under development.

However, it is possible to discriminate 12 or less-seater vehicles from 9 or more-seater vans that are allowed to use exclusive bus lanes through such an existing system, but there is a problem that it is difficult to figure out whether vehicles that are allowed to use exclusive bus lanes satisfy the number of in-vehicle persons because it is difficult to figure out the number of in-vehicle persons, so the regulation efficiency decreases.

SUMMARY

An objective of the present disclosure is to increase convenience and efficiency in regulation on violating vehicles not having the right to use exclusive bus lanes by detecting the car type and in-vehicle persons when a vehicle enters a highway entrance, issuing an exclusive bus lane pass to the vehicle when the vehicle satisfies a preset condition for using exclusive bus lanes, and providing support to be able to easily regulate violating vehicles even by only checking whether vehicles have the right to use exclusive bus lanes, depending on whether the vehicles have the pass, through car registration check based on plate numbers obtained through cameras installed on highways.

Another object of the present disclosure is to provide support to be able to easily regulate violating vehicles by only withdrawing a pass when in-vehicle persons do not satisfy a condition for using exclusive bus lanes by figuring out variation of in-vehicle persons at an exit tollgate of a highway, a rest area of a highway, a bus transfer area, or the like.

A surveillance system for detecting a vehicle violating an exclusive bus lane according to an embodiment of the present disclosure may include: a first imaging unit including one or more camera units disposed at a highway entrance tollgate or a highway on-ramp and configured to image a vehicle entering the highway; a first control device configured to create and transmit incoming vehicle information, which includes a car type, a plate number, and the number of in-vehicle persons of the vehicle, through image analysis on an image received from the first imaging unit; and a management server configured to compare incoming vehicle information received from the first control device with a pass-issuing condition set in advance about giving a right to pass an exclusive bus lane, and issue a pass to a vehicle corresponding to the incoming vehicle information and then match and store the pass with the incoming vehicle information when the pass-issuing condition is satisfied, and configured to, when receiving surveillance information including a recognized plate number from a surveillance camera device disposed on the highway and configured to recognize a plate number by analyzing an image obtained by imaging a vehicle running in an exclusive bus lane of the highway, check whether there is a pass matched with incoming vehicle information corresponding to the plate number according to the surveillance information, and detect a specific vehicle as a violating vehicle when there is no pass for the specific vehicle.

As an example related to the present disclosure, one or more car types that can be issued with the pass and a reference number of in-vehicle persons may be set in the pass-issuing condition.

As an example related to the present disclosure, the surveillance system may further include: a third imaging unit including one or more camera units disposed at a highway exit tollgate or a highway off-ramp and configured to image a vehicle going out of the highway; and a second control device configured to create and transmit outgoing vehicle information including a car type, a plate number, and the number of in-vehicle persons of a vehicle to the management server through image analysis on an image received from the second imaging unit, and the management server may match and store surveillance information received from the surveillance camera device with the incoming vehicle information corresponding to the surveillance information as log information about a history of using the exclusive bus lane; check whether there is a pass matched with the incoming vehicle information corresponding to the outgoing vehicle information when there is log information matched with incoming vehicle information vehicle corresponding to the outgoing information received from the second control device; and detect a vehicle corresponding to the outgoing vehicle information as a violating vehicle when there is no pass as the result of checking whether there is a pass, or compare the outgoing vehicle information with the pass-issuing condition when there is a pass as the result of checking whether there is a pass, and delete the pass issued in correspondence to the outgoing vehicle information and detect the vehicle corresponding to the outgoing vehicle information as a violating vehicle when the outgoing vehicle information does not satisfy the pass-issuing condition.

As an example related to the present disclosure, the management server may determine whether a specific vehicle corresponding to the outgoing vehicle information overspeeds, based on the incoming vehicle information corresponding to the outgoing vehicle information and the outgoing vehicle information when there is a pass corresponding to the outgoing vehicle information and the outgoing vehicle information satisfies the pass-issuing condition, and discount a highway toll of the vehicle corresponding to the outgoing vehicle information by communicating with a preset payment server, based on pre-stored user information corresponding to the outgoing vehicle information when the vehicle does not overspeed.

As an example related to the present disclosure, the surveillance system may further include: a third imaging unit including one or more camera units disposed at an exit of a rest area of the highway or an exit of a bus transfer station of the highway and configured to image a vehicle entering again the highway; and a third control device configured to create and transmit intermediate check information, which includes a car type, a plate number, and the number of in-vehicle persons of a vehicle, to the management server through image analysis on an image received from the third imaging unit, in which when there is a pass matched with incoming vehicle information corresponding to intermediate check information received from the third control device, the management server may compare the intermediate check information with the pass-issuing condition, and when the intermediate check information does not satisfy the pass-issuing condition, the management server may delete a pass issued to a vehicle corresponding to the intermediate check information.

As an example related to the present disclosure, when there is no pass matched with incoming vehicle information corresponding to the intermediate check information and the intermediate check information satisfies the pass-issuing condition, the management server may issue a pass to a vehicle corresponding to the intermediate check information and match and store the incoming vehicle information corresponding to the intermediate check information with the issued pass.

As an example related to the present disclosure, the first imaging unit may include a first camera unit configured to image a plate number of the vehicle, a second camera unit configured to image a left side of the vehicle, and a third camera unit configured to image a right side of the vehicle.

As an example related to the present disclosure, the first control device may obtain a plate number and a car type through image analysis on an image received from the first camera unit, recognize a plurality of seat regions respectively corresponding to first row seats and one or more rear row seats through image analysis on images received from the second camera unit and the third camera unit, respectively, and detect objects corresponding to in-vehicle persons in the plurality of seat regions, thereby calculating the number of in-vehicle persons.

As an example related to the present disclosure, the plurality of seat regions may include regions corresponding to a driver seat, a passenger seat, and a plurality of seats constituting two or more rows, respectively.

As an example related to the present disclosure, the second camera unit and the third camera unit may be near infrared (NIR) cameras and may provide images including objects corresponding to the in-vehicle persons without being influenced by reflection by windows or coating of the windows of the vehicle.

The present disclosure can issue a pass only to vehicles that can use an exclusive bus lane by checking the car type and the number of in-vehicle persons of vehicles entering a highway and can easily detect vehicles not having a pass as vehicles violating the exclusive bus lane on the basis of plate numbers received from the surveillance camera device surveilling vehicles running in the exclusive bus lane. Accordingly, it is possible not only to accurately detect violating vehicles violating the law about use of an exclusive bus lane on the basis of only whether a pass was issued without employing specific personnel for exclusive bus lane regulation, but to easily perform regulation using surveillance cameras configured in the past on a highway without the necessity of installing separate additional cameras on the highway. Therefore, there is an effect that it is possible to efficiency and economic efficiency for regulation on an exclusive bus lane.

Further, the present disclosure performs an intermediate check on a vehicle at the halfway point of a highway, thereby being able to detect a case in which the number of in-vehicle persons was checked wrong and a pass was issued to a vehicle that is not a pass-issuing object or a case in which the number of in-vehicle persons for using an exclusive bus lane was satisfied but some of the in-vehicle persons got off the vehicle later and the vehicle uses the exclusive bus lane without the reference number of in-vehicle persons for using the exclusive bus lane satisfied, and to withdraw the pass of the vehicle. Accordingly, support is provided to be able to detect and sanction a vehicle, which used an exclusive bus lane with a pass deprived, as a violating vehicle on the basis of information that is provided from a device disposed at an exit of a highway or information that is transmitted from the surveillance camera device, whereby there is an effect that it is possible to greatly increase accuracy in regulation on use of an exclusive bus lane.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION

Hereinafter, detailed embodiments of the present disclosure are described with reference to the drawings.

Figure 1:
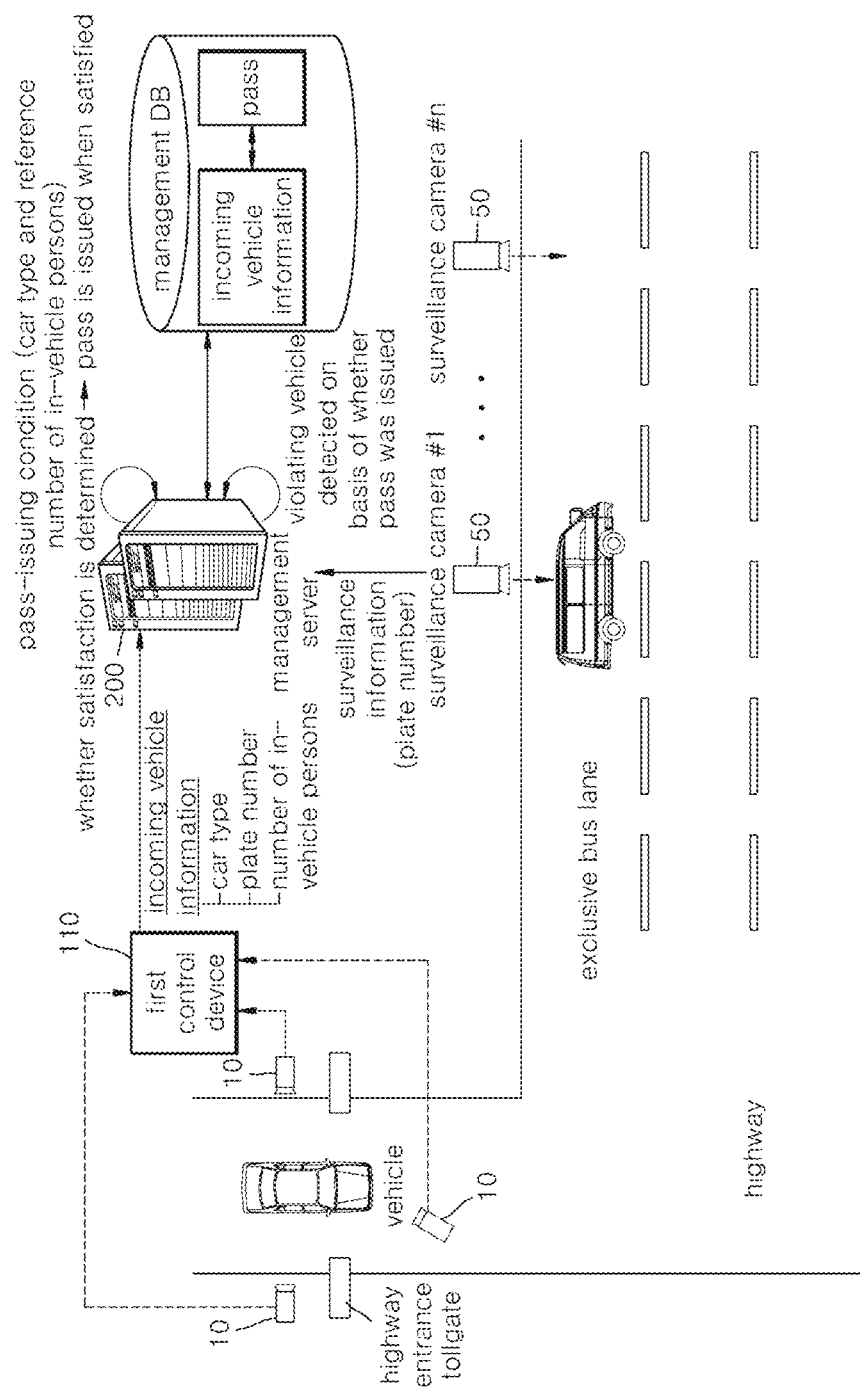
FIG. 1 is a configuration diagram of a surveillance system for detecting a vehicle violating an exclusive bus lane according to an embodiment of the present disclosure.

FIG. 1 is a configuration diagram of a surveillance system for detecting a vehicle violating an exclusive bus lane (hereafter, a surveillance system) according to an embodiment of the present disclosure.

Before describing, an exclusive bus lane stated in the present disclosure is a lane, which is provided for buses for activation of public transportation, of a plurality of lanes of a highway, and vehicles corresponding to 9 or more-seater passenger cars and vans are also prescribed as available vehicles by laws.

Further, it is prescribed by laws that 9 or more-seater passenger cars and 12 or less-seater vans of the vehicles described above that are not buses can use exclusive bus lanes only when six or more people in the vehicles.

However, vehicles, which correspond to the car types allowed to use exclusive bus lanes but need to satisfy a reference number of in-vehicle persons required to use exclusive bus lanes (legal number of in-vehicle persons (number of in-vehicle persons prescribed by laws), run with less than six persons in exclusive bus lanes in many cases, which causes traffic congestion in exclusive bus lanes. Policemen try to visually check car types and in-vehicle persons in person in order to prevent this problem, but it is difficult to check the number of in-vehicle persons of vehicles that are running. Further, the regulation method using surveillance cameras that is another regulation method only checks car types, so it is difficult to check in-vehicle persons, and accordingly, it is difficult to regulate violating vehicles that violate the laws about use of exclusive bus lanes (hereafter, violating vehicles).

In order to solve these problems, the configuration of a surveillance system of the present disclosure may include a first imaging unit 10 and a first control device 110 disposed at a highway entrance tollgate or a highway on-ramp, one or more surveillance camera devices 50 disposed on a highway, and a management server 200 communicating with the first control device 110 and the one or more surveillance camera devices 50 through a communication network.

In this configuration, the communication network described in the present disclosure may include wired/wireless communication networks, and the wireless communication network may include Wireless LAN (WLAN), Digital Living Network Alliance (DLNA), Wireless Broadband (Wibro), Interoperability World for Microwave Access (Wimax), Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), IEEE 802.16, Long Term Evolution (LTE), Long Term Evolution-Advanced (LTE-A), Wireless Mobile Broadband Service (WMBS), a 5G mobile communication service, Bluetooth, Long Range (LoRa), Radio Frequency Identification (RFID), Infrared Data Association (IrDA), Ultra Wideband (UWB), ZigBee, Near Field Communication (NFC), Ultra Sound Communication (USC), Visible Light Communication (VLC), Wi-Fi, Wi-Fi Direct, etc. Further, the wired communication network may include a Local Area Network (LAN), a wired Wide Area Network (WAN), Power Line Communication (PLC), USB communication, Ethernet, serial communication, an optical/coaxial cable, etc.

Through the configuration described above, the first control device 110 can transmit in-coming vehicle information, which includes the type, the plate number, and the number of in-vehicle persons of a vehicle, on the basis of an image received from the first imaging unit 10, and the management server 200 a can issue pass (pass information) authenticating (proving) the right to pass an exclusive bus lane when the vehicle is an available vehicle by checking whether the vehicle can use the exclusive bus lane by checking the car type and the number of in-vehicle persons on the basis of the in-coming vehicle information; and can easily detect a vehicle, which corresponds to a plate number not issued with a pass, as a violating vehicle on the basis of plate numbers received from the surveillance camera device 50 that recognizes plate numbers by imaging vehicles running the exclusive bus lane.

That is, the present disclosure can issue a pass to vehicles that can use an exclusive bus lane by checking the car type and the number of in-vehicle persons of vehicles at a tollgate before entering a highway, and, when a vehicle runs in the exclusive bus lane without a pass, can easily detect the vehicle as a violating vehicle through the surveillance camera device 50 that surveils vehicles running in the exclusive bus lane, so it is possible to increase efficiency and economic efficiency in exclusive bus lane regulation by accurately detecting vehicles violating use of exclusive bus lanes without specific personnel (manpower) for exclusive bus lane regulation, which is described hereafter in more detail with reference to drawings on the basis of the configuration described above.

First, an example of the operation of the surveillance system according to an embodiment of the present disclosure is described in detail with reference to the exemplary operation view of the surveillance system of FIG. 1 and the operation flowchart of the management server 200 according to an embodiment of the present disclosure shown in FIG. 2.

As shown in the figures, the first imaging unit 10 may include one or more camera units disposed at a highway entrance tollgate or a highway on-ramp and imaging a vehicle entering the highway, and can transmit images created by imaging the vehicle by the one or more camera units to the first control device 110.

In this configuration, the first control device 110 can communicate with each of the one or more camera units included in the first imaging unit 10 in a wired/wireless communication type, and the one or more camera units can transmit images created by imaging the vehicle to the first control device 110.

Further, the first imaging unit 10 may include a first camera unit that images the license plate or the front of the vehicle, a second camera unit that images the left side of the vehicle, and a third camera unit that images the right side of the vehicle.

Accordingly, the first camera unit 1 can transmit an image of the license plate of the vehicle to the first control device 110, the second camera unit can transmit an image of the left side of the vehicle to the first control device 110, and the third camera unit can transmit an image of the right side of the vehicle to the first control device 110.

Further, the first control device 110 can create and transmit incoming vehicle information, which includes the car type, the plate number, and the number of in-vehicle persons of the vehicle, to the management server 200 through image analysis on the images received from the first imaging unit 10 (the one or more camera units).

In this configuration, setting information about one or more car types that are pass-issuing objects may be set in advance in the first control device 110, and for example, the one or more car types that are pass-issuing objects may include a 9 or more-seater passenger car and 12 or less-seater vans.

Accordingly, the first control device 110 can create and transmit the incoming vehicle information to the management server 200 only when the car type of the vehicle corresponds to a pass-issuing object car type (any one of a 9 or more-seater passenger car and a 12 or less-seater van) according to the setting information through the image analysis.

As a detailed example of the above description, the first control device 110 recognizes and obtains the plate number and the car body of a vehicle through image analysis on an image received from the first camera unit, recognizes a plurality of seat regions respectively corresponding to the first row seats and one or more rear row seats of a vehicle through image analysis on the images received from the second camera unit and the third camera unit, respectively, and detects objects corresponding to in-vehicle persons (people) in the plurality of seat regions, thereby being able to calculate the number of in-vehicle persons.

That is, the first control device 110 can detect an object corresponding to a person in each of a plurality of seat regions through image analysis on an image of the left side of the vehicle and an image of the right side of the vehicle, and can calculate the number of in-vehicle persons in accordance with whether objects are detected in the plurality of seat regions while recognizing the detected objects as in-vehicle persons.

In this case, the plurality of seat regions may include regions respectively corresponding to a driver seat, a passenger seat, and a plurality of seats constituting two or more rows.

Further, the second camera unit and the third camera unit are near infrared (NIR) cameras and can provide images including objects corresponding to the in-vehicle persons without being influenced by reflection by windows or coating of the windows of the vehicle, thereby being able to provide support such that the first control device 110 can more accurately detect the number of in-vehicle persons.

In this configuration, when the first imaging unit 10 is composed of only one camera unit, the first imaging unit 10 may be a near infrared (NIR) camera and the first control device 110 may create the incoming vehicle information through image analysis on the image received from the first imaging unit 10.

Further, the first control device 110 may receive information about the car type corresponding to the plate number from a preset service server, which provides a car registration check service, by transmitting the plate number obtained through image analysis on the image received through the first camera unit to the service server.

In addition to the configuration described above, it is also possible to obtain a car type, a plate number, and the number of in-vehicle persons by applying an apparatus for detecting a boarding number of the prior art, using the method in Korean Patent No. 10-1973933 (Method and apparatus for detecting boarding number) by the applicant(s), to the first control device 110 of the present disclosure.

Further, if necessary, the first imaging unit 10 may further include a sensing device that is the same as the sensing device of the prior art. For example, the sensing device means a device including at least one sensor and collecting sensing information about a vehicle entering a highway using a pre-provided sensor and can collect vehicle-related information about the width, the length, the number of axles, axle arrangement, or the like of the vehicle using a pre-provided sensor. The vehicle-related information may mean car type information of the vehicle, that is, specific information that can be used as reference data when figuring out a car type. Further, the sensing device is a laser trigger, a camera, or an infrared camera, and can sense a vehicle entering a highway and provide the sensing information to the first control device 110.

Further, the first control device 110 can create and transmit incoming vehicle information, which includes the plate number, the car type, and the number of in-vehicle persons of a specific vehicle through image analysis on one or more images received from the first imaging unit 10, and can transmit the incoming vehicle information to the management server 200.

Figure 2:
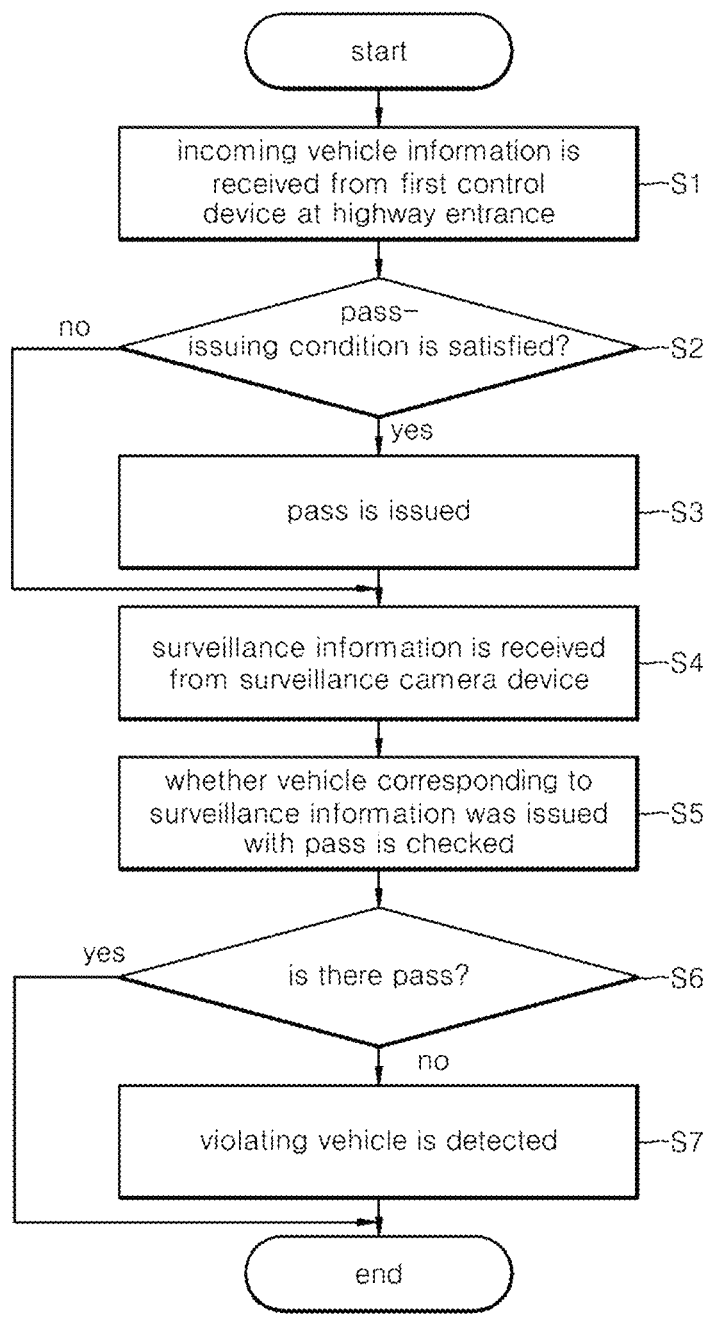
FIG. 2 is an operation flowchart of a management server according to an embodiment of the present disclosure.

Meanwhile, as shown in FIG. 2, when the management server 200 receives the incoming vehicle information from the first control device 110 (S1), the management server 200 compares the received incoming vehicle information with a preset pass-issuing condition for giving the right to pass the exclusive bus lane, and when the pass-issuing condition is satisfied (S2), the management server 200 can issue a pass to the vehicle corresponding to the received incoming vehicle information (S3).

In this case, the pass-issuing condition may include one or more car types and a reference number of in-vehicle persons (a legal number of in-vehicle persons) that are available for use of the exclusive bus lane, and the management server 200 compares the car type and the number of in-vehicle persons included in the incoming vehicle information with the car type and the reference number of in-vehicle persons set in the pass-issuing condition, and when the car type according to the incoming vehicle information is a car type that can use the exclusive bus lane and the number of in-vehicle persons according to the incoming vehicle information is the reference number of in-vehicle persons (e.g., six persons) or more, the management server 200 can create and issue a pass (or pass information), which allows use of the exclusive bus lane, to the vehicle corresponding to the incoming vehicle information.

In this case, as the pass-issuing condition, under-9-seater passenger cars, etc. may be set as non-pass-issuing car types, and when the car type included in incoming vehicle information pertains to non-pass-issuing car types according to the pass-issuing condition, the management server 200 may not issue a pass to the vehicle corresponding to the incoming vehicle information.

Further, the management server 200 can match and store the issued pass with the incoming vehicle information in a DB, and can store only incoming vehicle management information in the management DB for incoming vehicle information not issued with a pass.

In this configuration, the management DB may be included in the management server 200 or may be a separate database server.

Further, an always-allowed car type (e.g., a bus or an over-12-seater van) may be set for the car types that can use the exclusive bus lane regardless of the number of in-vehicle persons in the pass-issuing condition, and when the car type according to the incoming vehicle information corresponds to the always-allowed car type, the management server 200 deletes the incoming vehicle information without storing it in the management DB, thereby being able to exclude the vehicle from management objects for vehicle regulation.

Meanwhile, the surveillance camera device 50 may be disposed on a highway (the mainline of a highway), and one or more surveillance camera devices 50 may be disposed on a highway.

Further, the surveillance camera device 50 can image vehicles running the exclusive bus lane of a highway, whereby it is possible to recognize plate numbers through image analysis on created images and to create and transmit surveillance information including the recognized plate numbers to the management server 200.

In this case, one or more surveillance camera devices 50 may be disposed at different locations on the highway and the one or more surveillance camera devices 50 each can create and transmit the surveillance information to the management server 200.

Further, a surveillance camera constructed (configured) in the past on a highway for speed violation regulation may be used as the surveillance camera device 50.

According to the configuration described above, when receiving surveillance information from the surveillance camera device 50, the management server 200 can search the management DB on the basis of a plate number according to the received surveillance information (S4).

Further, the management server 200 finds out incoming vehicle information, which corresponds to the plate number according to the surveillance information, from the management DB and checks whether there is a pass matched with the recognized incoming vehicle information through the management DB, thereby being able to check whether a pass was issued to the vehicle corresponding to the recognized incoming vehicle information (S5).

In this case, the incoming vehicle information may include entry time information about an entry time that is the time at which a vehicle reached a highway entrance tollgate or a highway on-ramp or the time at which the vehicle was imaged at the highway entrance tollgate or the highway on-ramp, and the surveillance information may include recognition time information (or imaging time information) about the time at which the surveillance camera device 50 recognized (imaged) the plate number.

Accordingly, when receiving the surveillance information, the management server 200 can find out incoming vehicle information, which includes a plate number the same as the plate number according to the surveillance information and includes entry time information in which an entry time having the least (smallest) time difference from the time according to the recognition information time included in the surveillance information is set, as incoming vehicle information corresponding to the surveillance information in the management DB.

Further, when a pass matched to a specific vehicle according to incoming vehicle information corresponding to the surveillance information does not exist in the management DB (S6), the management server 200 can detect the specific vehicle as a violating vehicle (S7).

Further, the management server 200 can create and transmit violation information to a preset public institution-related institution server on the basis of incoming vehicle information corresponding to the specific vehicle detected as a violating vehicle, and accordingly, can make sanction such as imposing a penalty on the specific vehicle be applied.

In this case, the violation information may include the incoming vehicle information.

As described above, the present disclosure can issue a pass only to vehicles that can use an exclusive bus lane by checking the car type and the number of in-vehicle persons of vehicles entering a highway and can easily detect vehicles not having a pass as vehicles violating the exclusive bus lane on the basis of plate numbers received from the surveillance camera device 50 surveilling vehicles running in the exclusive bus lane. Accordingly, it is possible not only to accurately detect violating vehicles violating the law about use of an exclusive bus lane on the basis of only whether a pass was issued without employing specific personnel for exclusive bus lane regulation, but to easily perform regulation using surveillance cameras configured in the past on a highway without the necessity of installing separate additional cameras on the highway. Therefore, it is possible to increase efficiency and economic efficiency for regulation on an exclusive bus lane.

In addition to the configuration described above, various embodiments of accurately detecting violating vehicles that violate use of an exclusive bus lane are described.

Figure 3:
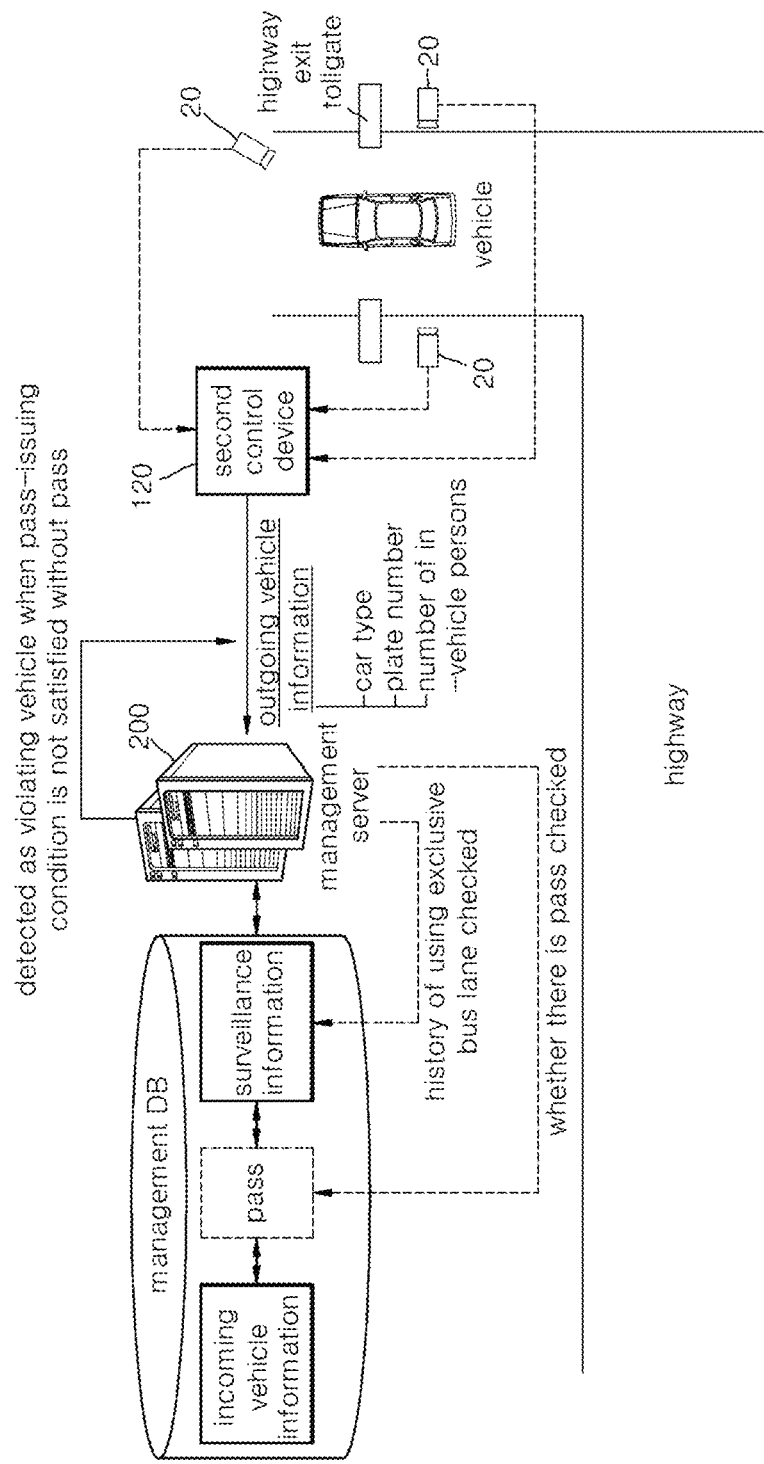
FIG. 3 is an exemplary operation diagram of exclusive bus lane violation vehicle detection that is performed on vehicles going out through a highway exit by the surveillance system for detecting a vehicle violating an exclusive bus lane according to an embodiment of the present disclosure.
Figure 4:
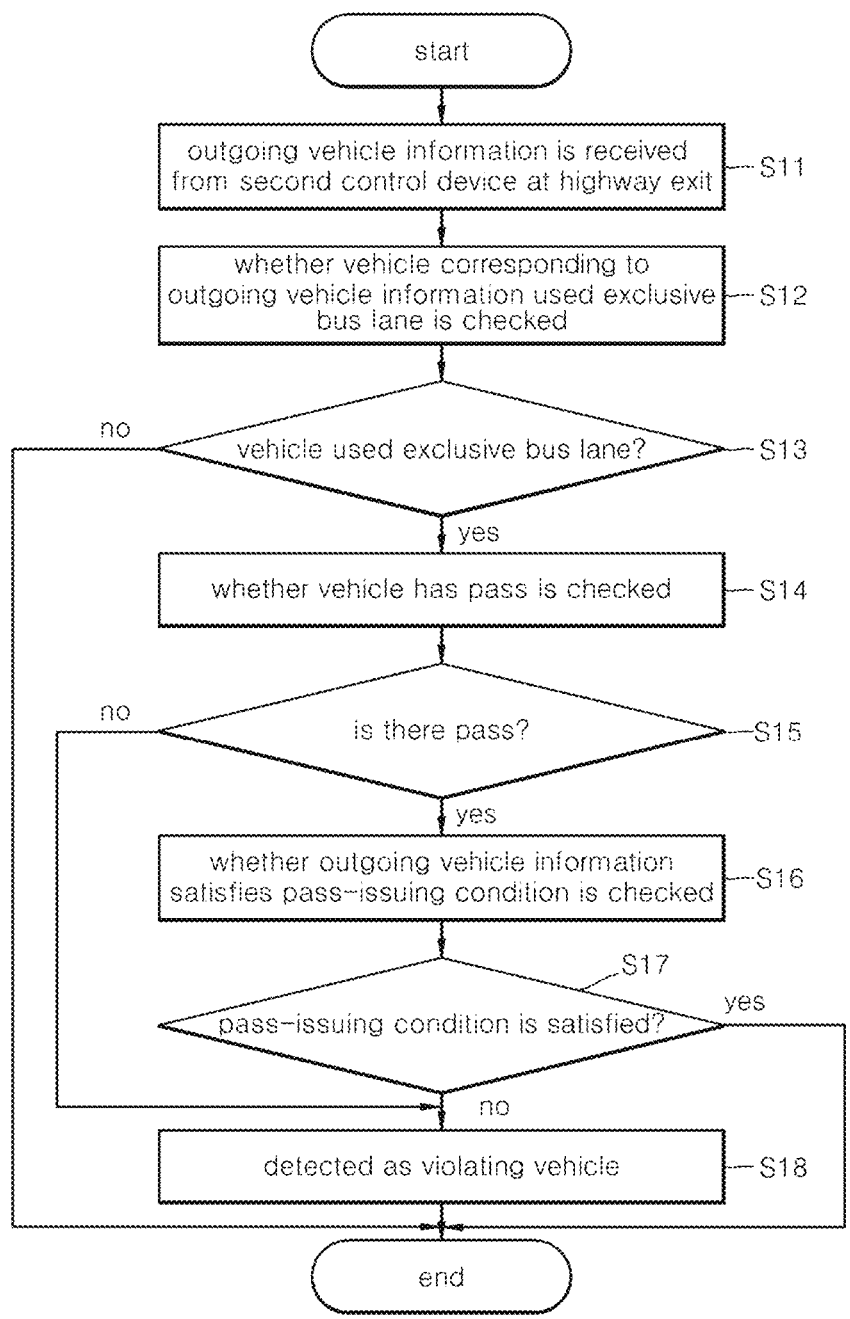
FIG. 4 is an operation flowchart of a management server according to another embodiment of the present disclosure.

An example of the operation of a surveillance system according to another embodiment of the present disclosure is described with reference to FIG. 3 and FIG. 4.

First, a surveillance system according to the present disclosure may further include a second imaging unit 20 and a second control device 120 that are installed at a highway exit tollgate or a highway off-ramp.

The second imaging unit 20 may include one or more camera units disposed at the highway exit tollgate or the highway off-ramp and imaging vehicles going out of the highway (going out from the highway to the outside of the highway).

In this configuration, the second imaging unit 20 may have the same configuration as the first imaging unit 10 and may include a fourth camera unit having the same configuration (function) as the first camera unit, a fifth camera unit having the same configuration as the second camera unit, and a sixth camera unit having the same configuration as the third camera unit.

Further, if necessary, the second imaging unit 20 may further include a sensing device that has the same configuration (function) as the sensing device included in the first imaging unit 10 and senses vehicles going out of a highway to the outside.

Further, the second control device 120 can perform the same function as the first control device 110 because it has the same configuration as the first control device 110, and can create and transmit outgoing vehicle information, which includes the car type, the plate number, and the number of in-vehicle persons of a vehicle, to the management server 200 through image analysis on an image received from the second imaging unit 20.

Accordingly, when receiving the outgoing vehicle information from the second control device 120, the management server 200 searches the management DB on the basis of the received outgoing vehicle information, thereby being able to find out incoming vehicle information including a plate number the same as the plate number according to the outgoing vehicle information (S11).

In this case, the incoming vehicle information may include entry time information about an entry time that is the time at which a vehicle reached to a highway entrance tollgate or a highway on-ramp or the time at which the vehicle was imaged at the highway entrance tollgate or the highway on-ramp, and may include exit time information about an exit time that is the time at which a vehicle reached a highway exit tollgate or a highway off-ramp or the time at which the vehicle was imaged at the highway exit tollgate or the highway off-ramp.

Accordingly, the management server 200 can find out and extract incoming vehicle information, which has the least time difference from the exit time information according to the outgoing vehicle information and has a plate number the same as the plate number according to the outgoing vehicle information, from the management DB as incoming vehicle information matched (corresponding) to the outgoing vehicle information.

Further, the management server 200 can match and store surveillance information received from each of the one or more surveillance camera devices 50, as log information, with incoming vehicle information corresponding to the surveillance information in the management DB, whereby it is possible to store an exclusive bus lane use history of the vehicle corresponding to the surveillance information as a log in the management DB.

In this case, the log information may further include recognition time information (or imaging time information) about the time at which the surveillance camera device 50 recognized (imaged) the plate number, and when the management server 200 matches and stores the log information with the incoming vehicle information, the management server 200 can match and store the log information with incoming vehicle information, which has entry time information having the least time difference from the time according to recognition time information according to the log information, in the management DB.

Accordingly, when the management serve 200 receives the outgoing vehicle information from the second control device 120, the management server 200 can find out incoming vehicle information corresponding to the outgoing vehicle information, and can check whether a specific vehicle corresponding to the outgoing vehicle information used the exclusive bus lane on the basis of whether there is log information matched with incoming vehicle information corresponding to the outgoing vehicle information (S12).

Further, when there is log information of the specific vehicle in the management DB and accordingly there is a history of using the exclusive bus lane (S13), the management server 200 can check whether a pass was issued to the specific vehicle by checking whether a pass matched with incoming vehicle information corresponding to the outgoing vehicle information related to the specific vehicle exists in the management DB (S14).

Further, when a pass matched with the specific vehicle having a history of using the exclusive bus lane does not exist in the management DB and accordingly there is no fact that a pass was issued to the specific vehicle (S15), the management server 200 can detect the specific vehicle as a violating vehicle (S18) and can create and transmit violation information to the institution server on the basis of the outgoing vehicle information or the incoming vehicle information of the specific vehicle.

Alternatively, when a pass issued to the specific vehicle exists in the management DB as the result of checking whether the pass for the specific vehicle exists (was issued) (S15), the management server 200 can compare the outgoing vehicle information with the pass-issuing condition (S16).

Further, when there is a history of using the exclusive bus lane and the outgoing vehicle information of the specific vehicle issued with a pass does not satisfy the pass-issuing condition (S17), the management server 200 can delete the pass issued in correspondence to the outgoing vehicle information from the management DB, detect the specific vehicle corresponding to the outgoing vehicle information as a violating vehicle, and as described above, create and transmit violation information for the specific vehicle to the institution server (S18).

For example, the management server 200 compares the number of in-vehicle persons according to the outgoing vehicle information with the reference number of in-vehicle persons according to the pass-issuing condition, and when the number of in-vehicle persons according to the outgoing vehicle information is less than the reference number of in-vehicle persons according to the pass-issuing condition, the management server 200 can determine that the pass-issuing condition is not satisfied, and can create and transmit violation information to the institution server on the basis of the outgoing vehicle information.

In this case, the management server 200 may create and transmit violation information including all of the incoming vehicle information, the outgoing vehicle information, and one or more items of log information corresponding to the specific vehicle to the institution server.

In the configuration described above, when there is a pass corresponding to the outgoing vehicle information and the outgoing vehicle information satisfies the pass-issuing condition, the management server 200 can discount the highway toll of the vehicle corresponding to the outgoing vehicle information by communicating with a preset payment server on the basis of pre-stored user information corresponding to the outgoing vehicle information.

In this case, the management server 200 may further include a user DB storing the user information in addition to the management DB, and the user information may include user's payment type-related payment type information for paying a highway toll, user identification information, a personal identification number (PIN), a plate number, etc.

Alternatively, the management server 200 can match and store the outgoing vehicle information with incoming vehicle information corresponding to the outgoing vehicle information in the management server DB, determine whether a specific vehicle corresponding to the outgoing vehicle information overspeed on the basis of the incoming vehicle information and the outgoing vehicle information, and discount the highway toll of the specific vehicle, as described above, when the vehicle did not overspeed.

Further, the management server 200 may create and store passage history information obtained by matching incoming vehicle information, which includes a plate number of the outgoing vehicle information and has an entry time closest to an exit time included in the outgoing vehicle information, and a pass with each other in the management DB when receiving the outgoing vehicle information of a specific vehicle; may set the specific vehicle as a discount object for highway toll discount when receiving incoming vehicle information of the specific vehicle accompanying reentry into the highway of the specific vehicle within a preset time from the exit time; and may recognize the specific vehicle set as a discount object on the basis of outgoing vehicle information received when the specific vehicle goes out of the highway after entering again the highway, and then discount the highway toll of the specific vehicle.

Figure 5:
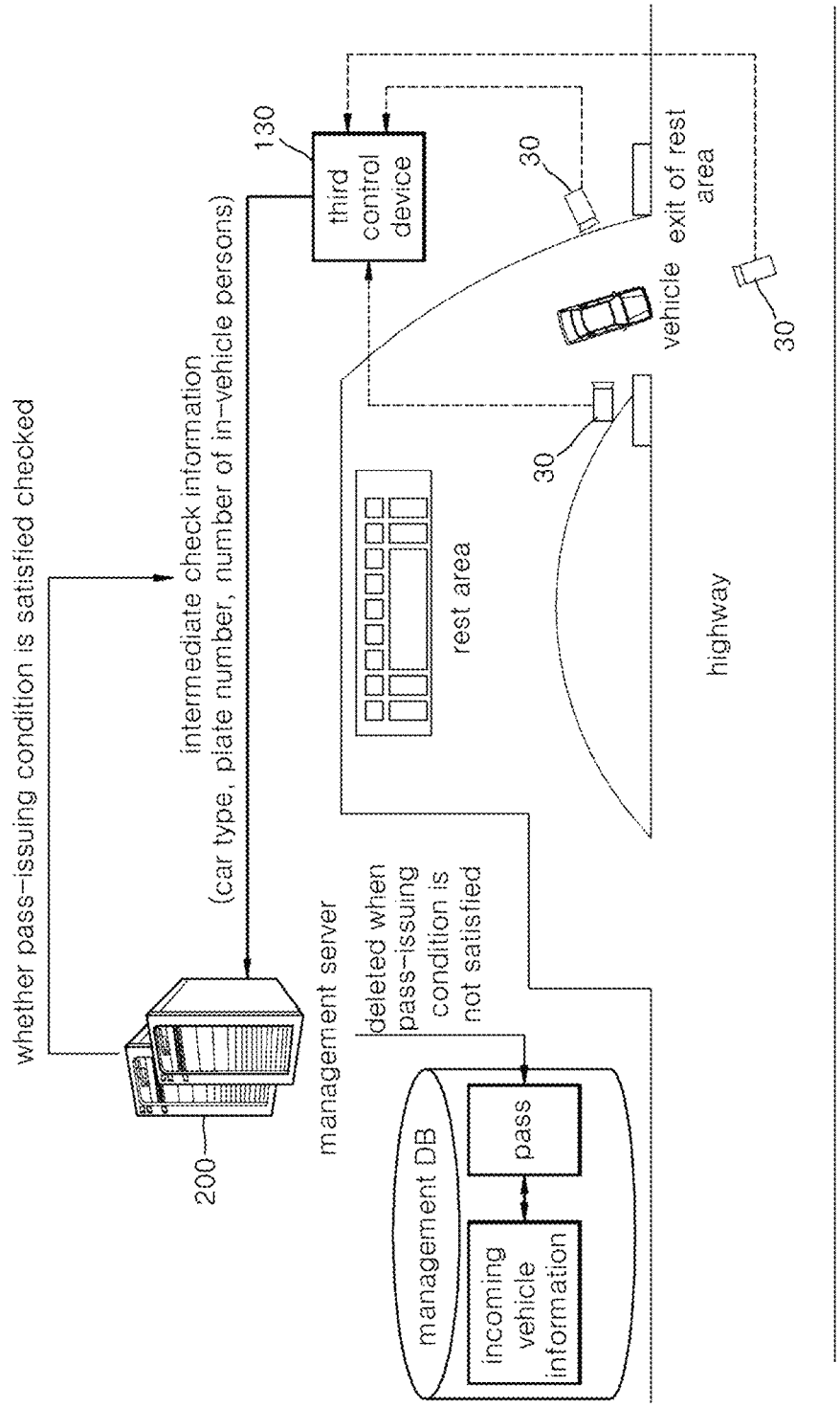
FIG. 5 is an exemplary operation diagram of exclusive bus lane violation vehicle detection that is performed on vehicles that are using a highway exit by the surveillance system for detecting a vehicle violating an exclusive bus lane according to an embodiment of the present disclosure.

Meanwhile, the present disclosure can withdraw (deprive) a pass such that a vehicle is sanctioned when the number of in-vehicle persons of the vehicle does not satisfy the reference number of in-vehicle persons according to a pass-issuing condition as the result of an intermediate check on the number of in-vehicle persons at the exit of a rest area of a highway or the exit of a bus transfer station of a highway, which is described in detail with reference to FIG. 5.

To this end, the surveillance system according to the present disclosure may further include a third imaging unit 30 including one or more camera units disposed at the exit of a rest area of a highway or the exit of a bus transfer station of a highway and imaging vehicles entering again the highway, and a third control device 130 creating and transmitting intermediate check information, which includes the car type, the plate number, and the number of in-vehicle persons of vehicles, through image analysis on images received from the third imaging unit 30.

In this configuration, the third imaging unit 30 may have the same configuration as the first imaging unit 10 and may include a seventh camera unit having the same configuration (function) as the first camera unit, an eighth camera unit having the same configuration as the second camera unit, and a ninth camera unit having the same configuration as the third camera unit.

Further, if necessary, the third imaging unit 30 may further include a sensing device that has the same configuration (function) as the sensing device included in the first imaging unit 10 and senses vehicles that go out of a highway to the outside.

Further, the third control device 130 can perform the same function as the first control device 110 because it has the same configuration as the first control device 110, and can create and transmit intermediate check information, which includes the car type, the plate number, and the number of in-vehicle persons of a vehicle, to the management server 200 through image analysis on an image received from the third imaging unit 30.

Accordingly, when a pass matched with incoming vehicle information corresponding to intermediate check information received from the third control device 130 exist in the management DB, the management server 200 compares the intermediate check information with the pass-issuing condition, and when the intermediate check information does not satisfy the pass-issuing condition, the management server 200 can delete the pass issued to the vehicle corresponding to the intermediate check information from the management DB.

For example, the management server 200 can find out information corresponding to the incoming vehicle intermediate check information by searching the management DB on the basis of the intermediate check information when receiving the intermediate check information from the third control device 130.

In this case, the intermediate check information may include check time information about the time at which the vehicle was imaged at (passed) the exit of a rest area of the highway or the exit of a bus transfer station of the highway, and the management server 200 can find out incoming vehicle information, which has entry time information having the least time difference from the time according to the check time information, as incoming vehicle information corresponding to the intermediate check information from the management DB.

Further, the management server 200 determines whether a pass matched with the incoming vehicle information corresponding to the intermediate check information exists in the management DB, thereby being able to check whether a pass was issued to a specific vehicle corresponding to the intermediate check information.

When there is a pass matched with the incoming vehicle information corresponding to the intermediate check information and accordingly there is a fact that a pass was issued to the specific vehicle, the management server 200 compares the car type and the number of in-vehicle persons according to the intermediate check information with the car type and the number of in-vehicle persons according to the pass-issuing condition, thereby being able to determine whether the intermediate check information satisfies the pass-issuing condition. Further, when the number of in-vehicle persons according to the intermediate check information is less than the reference number of in-vehicle persons and accordingly the intermediate check information does not satisfy the pass-issuing condition, the management server 200 can withdraw (deprive) the pass issued to the specific vehicle by deleting the pass from the management DB.

In addition to the configuration described above, when a pass matched with the incoming vehicle information corresponding to the intermediate check information does not exist in the management DB and the intermediate check information does not satisfy the pass-issuing condition, the management server 200 can issue a pass to the vehicle corresponding to the intermediate check information and can match and store the issued pass with the incoming vehicle information corresponding to the intermediate check information in the management DB.

In this case, the management server 200 can match and store also the intermediate check information with the incoming vehicle information corresponding to the intermediate check information in the management DB.

Further, in the configuration described above, pass information corresponding to the pass may include the plate number and the number of in-vehicle persons of the vehicle that is a pass-issuing object.

Accordingly, when issuing a pass on the basis of the intermediate check information, the management server 200 can issue a pass including the number of in-vehicle persons and a plate number according to the number of in-vehicle persons.

Therefore, the management server 200 performs an intermediate check on a vehicle at the halfway point of a highway, thereby being able to detect a case in which the number of in-vehicle persons was checked wrong and a pass was issued to a vehicle that is not a pass-issuing object or a case in which the number of in-vehicle persons for using an exclusive bus lane was satisfied but some of the in-vehicle persons got off the vehicle later and the vehicle uses the exclusive bus lane without the reference number of in-vehicle persons for using the exclusive bus lane satisfied, and to withdraw the pass of the vehicle. Accordingly, support is provided to be able to detect and sanction a vehicle, which used an exclusive bus lane with a pass deprived, as a violating vehicle on the basis of information that is provided from a device disposed at an exit of a highway or information that is transmitted from the surveillance camera device 50, whereby it is possible to greatly increase accuracy in regulation on use of an exclusive bus lane.

Meanwhile, the first control device 110, the second control device 120, the third control device 130, and the management server 200 described herein may include a communication unit for communicating with various other devices, and a controller for performing a general control function on a storage unit, a device, or a server for storing various items of information.

Further, the controller may include a RAM, a ROM, a CPU, a GPU, and a bus, the RAM, ROM, CPU, GPU, etc. may be connected to each other through buses, and the CPU can access a storage unit and can perform various operations described herein using various programs, contents, data, etc. stored in the storage unit.

The components described in the embodiments of the present disclosure may be achieved by one or more common computers or computers for specific purposes, such as a storage, for example, a memory; hardware such as a processor, a control device, an ALU (arithmetic logic unit), a digital signal processor, a microcomputer, an FPGA (Field Programmable Gate Array), a PLU (programmable logic unit), and a microprocessor; and any devices that can execute software including a set of instructions and a combination thereof or instructions and can give responses.

The above description may be changed and modified by those skilled in the art without departing from the fundamental characteristics of the present disclosure. Accordingly, the embodiments described herein are provided merely not to limit, but to explain the spirit of the present disclosure, and the spirit of the present disclosure is not limited by the embodiments. The protective range of the present disclosure should be construed by the following claims and the scope and spirit of the present disclosure should be construed as being included in the patent right of the present disclosure.

DESCRIPTION OF SYMBOLS

10: First imaging unit
20: Second imaging unit
30: Third imaging unit
50: Surveillance camera device
110: First control device
120: Second control device
130: Third control device
200: Management server

What is claimed is:

1. A surveillance system for detecting a vehicle violating an exclusive bus lane, the surveillance system comprising:
a first imaging unit including one or more camera units disposed at a highway entrance tollgate or a highway on-ramp and configured to image a vehicle entering the highway;
a first control device configured to create and transmit incoming vehicle information, which includes a car type, a plate number, and the number of in-vehicle persons of the vehicle, through image analysis on an image received from the first imaging unit;
a second imaging unit including one or more camera units disposed at a highway exit tollgate or a highway off-ramp and configured to image a vehicle going out of the highway;
a second control device configured to create and transmit outgoing vehicle information, which includes a car type, a plate number, and the number of in-vehicle persons of the vehicle, through image analysis on an image received from the first imaging unit; and
a management server configured to compare incoming vehicle information received from the first control device with a pass-issuing condition set in advance about giving a right to pass an exclusive bus lane, and issue a pass to a vehicle corresponding to the incoming vehicle information and then match and store the pass with the incoming vehicle information when the pass-issuing condition is satisfied,
configured to, when receiving surveillance information including a recognized plate number from a surveillance camera device disposed on the highway and configured to recognize a plate number by analyzing an image obtained by imaging a vehicle running in an exclusive bus lane of the highway, match and store the surveillance information with the incoming vehicle information corresponding to the surveillance information as log information about a history of using the exclusive bus lane, check whether there is a pass matched with incoming vehicle information corresponding to the plate number according to the surveillance information, and detect a specific vehicle as a violating vehicle when there is no pass for the specific vehicle,
configured to, when there is log information matched with incoming vehicle information corresponding to the outgoing vehicle information received from the second control device, check whether there is a pass matched with the incoming vehicle information corresponding to the outgoing vehicle information, and
configured to detect a vehicle corresponding to the outgoing vehicle information as a violating vehicle when there is no pass as the result of checking whether there is a pass, or configured to, when there is a pass as the result of checking whether there is a pass, compare the outgoing vehicle information with the pass-issuing condition, and delete the pass issued in correspondence to the outgoing vehicle information and detect the vehicle corresponding to the outgoing vehicle information as a violating vehicle when the outgoing vehicle information does not satisfy the pass-issuing condition.

2. The surveillance system of claim 1, wherein one or more car types that can be issued with the pass and a reference number of in-vehicle persons are set in the pass-issuing condition.

3. The surveillance system of claim 1, wherein the management server determines whether a specific vehicle corresponding to the outgoing vehicle information overspeeds, based on the incoming vehicle information corresponding to the outgoing vehicle information and the outgoing vehicle information when there is a pass corresponding to the outgoing vehicle information and the outgoing vehicle information satisfies the pass-issuing condition, and
discounts a highway toll of the vehicle corresponding to the outgoing vehicle information by communicating with a preset payment server, based on pre-stored user information corresponding to the outgoing vehicle information when the vehicle does not overspeed.

4. The surveillance system of claim 1, further comprising:
a third imaging unit including one or more camera units disposed at an exit of a rest area of the highway or an exit of a bus transfer station of the highway and configured to image a vehicle entering again the highway; and
a third control device configured to create and transmit intermediate check information, which includes a car type, a plate number, and the number of in-vehicle persons of a vehicle, to the management server through image analysis on an image received from the third imaging unit,
wherein when there is a pass matched with incoming vehicle information corresponding to intermediate check information received from the third control device, the management server compares the intermediate check information with the pass-issuing condition, and
when the intermediate check information does not satisfy the pass-issuing condition, the management server deletes a pass issued to a vehicle corresponding to the intermediate check information.

5. The surveillance system of claim 4, wherein when there is no pass matched with incoming vehicle information corresponding to the intermediate check information and the intermediate check information satisfies the pass-issuing condition, the management server issues a pass to a vehicle corresponding to the intermediate check information and matches and stores the incoming vehicle information corresponding to the intermediate check information with the issued pass.

6. The surveillance system of claim 1, wherein the first imaging unit includes a first camera unit configured to image a plate number of the vehicle, a second camera unit configured to image a left side of the vehicle, and a third camera unit configured to image a right side of the vehicle.

7. The surveillance system of claim 6, wherein the first control device obtains a plate number and a car type through image analysis on an image received from the first camera unit, recognizes a plurality of seat regions respectively corresponding to first row seats and one or more rear row seats through image analysis on images received from the second camera unit and the third camera unit, respectively, and detects objects corresponding to in-vehicle persons in the plurality of seat regions, thereby calculating the number of in-vehicle persons.

8. The surveillance system of claim 7, wherein the plurality of seat regions includes regions corresponding to a driver seat, a passenger seat, and a plurality of seats constituting two or more rows, respectively.

9. The surveillance system of claim 8, wherein the second camera unit and the third camera unit are near infrared (NIR) cameras and provide images including objects corresponding to the in-vehicle persons without being influenced by reflection by windows or coating of the windows of the vehicle.

\* \* \* \* \*